US011573330B2

(12) United States Patent
Broumandan

(10) Patent No.: US 11,573,330 B2
(45) Date of Patent: Feb. 7, 2023

(54) SYSTEM AND METHOD FOR DETECTING SPOOFING OF GLOBAL NAVIGATION SATELLITE SYSTEM SIGNALS USING A SINGLE ANTENNA

(71) Applicant: NovAtel Inc., Calgary (CA)

(72) Inventor: Ali Broumandan, Calgary (CA)

(73) Assignee: NovAtel Inc., Calgary (CA)

( * ) Notice: Subject to any disclaimer, the term of this patent is extended or adjusted under 35 U.S.C. 154(b) by 0 days.

(21) Appl. No.: 17/166,371

(22) Filed: Feb. 3, 2021

(65) Prior Publication Data

US 2021/0255331 A1     Aug. 19, 2021

Related U.S. Application Data

(60) Provisional application No. 62/978,524, filed on Feb. 19, 2020.

(51) Int. Cl.
*G01S 19/21*     (2010.01)
*G01S 19/37*     (2010.01)

(52) U.S. Cl.
CPC ............ *G01S 19/215* (2013.01); *G01S 19/37* (2013.01)

(58) Field of Classification Search
CPC .............................................. G01S 19/21–215
See application file for complete search history.

(56) References Cited

U.S. PATENT DOCUMENTS

| 5,952,968 A * | 9/1999 | McDowell | G01S 19/36 |
| | | | 342/383 |
| 9,297,904 B2 * | 3/2016 | Scheitlin | G01S 19/15 |
| 10,024,973 B1 * | 7/2018 | Alexander | G01S 19/215 |
| 10,466,700 B1 * | 11/2019 | Carmack | H04K 3/224 |

FOREIGN PATENT DOCUMENTS

| CN | 107621645 B | 7/2019 |
| EP | 2738574 A1 | 6/2014 |
| EP | 3502745 A1 | 6/2019 |

OTHER PUBLICATIONS

Kaplan et. al., "Understanding GPS Principles and Applications", 2006, Artech House, 2nd ed., p. 185 (Year: 2006).*
Cavaleri, Antonio, et al., "Detection of Spoofed GPS Signals at Code and Carrier Tracking Level," IEEE, 2010 5th ESA Workshop on Satellite Navigation Technologies and European Workshop on GSS Signals and Signal Processing (NAVITEC), Dec. 8, 2010, pp. 1-6.
"European Search Report and Written Opinion," European Application No. 21 157 378.7-1216, Applicant: NovAtel Inc., dated Jul. 12, 2021, pp. 1-7.
Junzhi, Li, et al., "Research Progress of GNSS Spoofing and Spoofing Detection Technology," IEEE, 2019 IEEE 19th International Conference on Communication Technology (ICCT), Oct. 16, 2019, pp. 1360-1369.
Akos, DM. "GNSS RFI/Spoofing: Detection, Localization, & Mitigation." Presentation. Stanford: Stanford's 2012 PNT Challenges and Opportunities Symposium, Nov. 14, 2012, 38 pages.

(Continued)

*Primary Examiner* — Cassi J Galt
(74) *Attorney, Agent, or Firm* — Cesari and McKenna, LLP

(57) ABSTRACT

A system and method for detecting spoofing of global navigation satellite system (GNSS) signals using a single antenna is provided.

23 Claims, 7 Drawing Sheets

(56) References Cited

OTHER PUBLICATIONS

De Wilde, Wim, et al. "Spoofing threats: Reality check, impact and cure." *Proceedings of the 30th international Technical Meeting of The Satellite Division of the Institute of Navigation (ION GNSS+ 2017)*. 2017, 39 pages.
Humphreys, Todd E., et al. "The Texas spoofing test battery: Toward a standard for evaluating GPS signal authentication techniques." GNSS Conference Nashville, TN, Sep. 18-21, 2012, 15 pages.
Jafarnia-Jahromi, Ali, et al. "GPS vulnerability to spoofing threats and a review of antispoofing techniques." *International Journal of Navigation and Observation* vol. 2012 (2012), 17 pages.
Jafarnia Jahromi, Ali, et al. "GPS spoofer countermeasure effectiveness based on signal strength, noise power, and C/N0 measurements." *International Journal of Satellite Communications and Networking* 30.4 (2012) pp. 181-191.
Manfredini et al., Optimized GNSS spoofing detection using commercial receivers Field Data and Experimental Trials, Standford PNT Symposium, Jan. 11, 2016, 28 pages.
Psiaki, Mark L.. and Todd E. Humphreys. "GNSS spoofing and detection." *Proceedings of the IEEE* 104.6 (2016) 11 pages.

\* cited by examiner

SYSTEM AND METHOD FOR DETECTING SPOOFING OF GLOBAL NAVIGATION SATELLITE SYSTEM SIGNALS USING A SINGLE ANTENNA

CROSS-REFERENCE TO RELATED APPLICATIONS

The present application claims the benefit of U.S. Provisional Patent Application Ser. No. 62/978,524, which was filed on Feb. 19, 2020, by Ali Broumandan for SYSTEM AND METHOD FOR DETECTING SPOOFING OF GLOBAL NAVIGATION SATELLITE SYSTEM SIGNALS USING A SINGLE ANTENNA, which is hereby incorporated by reference.

BACKGROUND

Technical Field

The present relates to global navigation satellite systems (GNSS) and more particularly to the detection of spoofing attacks on GNSS systems.

Background Information

Global navigation satellite systems (GNSS) are utilized for a variety of purposes, many of which have strict reliability requirements as they involve safety of life (SoL) services associated with critical missions such as aviation, maritime, and/or land transportation. For example, autonomous vehicle navigation requires accurate and precise positioning information to avoid the vehicle impacting with other vehicles, pedestrians, and/or structures. Similarly, navigating a vessel through a specified maritime channel requires accurate position information to avoid shallow areas, underwater wrecks, etc. Spoofing and/or jamming attacks on GNSS receivers have become a serious threat to these critical applications of GNSS position information.

As used herein, a jamming attack is generally defined as the broadcasting of signals on GNSS frequencies that overwhelm the legitimate GNSS signals and aim to prevent a GNSS receiver from determining a position. Similarly, as used herein, a spoofing attack is generally defined as the broadcasting of fake GNSS signals that are designed to cause a receiver to determine an incorrect position. Both attacks may occur simultaneously, i.e., spoofing signals may be transmitted with such a high power that they initially cause a receiver to lose tracking of the GNSS satellite signals, thereby resulting in a jamming attack. The spoofing signals may then be reduced in power so that the receiver locks onto the spoofing signal and utilizes the spoofing signal to calculate position.

It is desirous for GNSS receivers to be capable of identifying when a spoofing attack is occurring so that the GNSS receiver, or another component that is using the GNSS position information, may perform appropriate remediation. For example, if a receiver determines that it is receiving spoofed signals, it may cease to output position information, thereby preventing incorrect position information from being utilized in a manner that could cause harm. Additionally, should a receiver determine that it is being spoofed, appropriate countermeasures, may be utilized to reduce the impact of the spoofer.

SUMMARY

Systems and methods for global navigation satellite system (GNSS) spoofing/jamming detection utilizing a single antenna are provided. In an illustrative embodiment, a receiver monitors the pre-despreading and post-despreading power measurements (PPPM). More specifically, the receiver analyzes the total in band power that is being received as well as the average carrier to noise ratio ($C/N_0$) of the received GNSS signal. It has been empirically shown that attenuation of average $C/N_0$ is correlated with the extra power received by the receiver antenna in the jamming case. During the calibration process of a receiver, the receiver calculates the total in-band power and average $C/N_0$ of high elevation signals. Additionally, the receiver calculates the maximum possible $C/N_0$ in the calibration process ($C/N_{MaxCal}$) for a given setup in a spoofing/jamming free open sky condition. In the detection mode, the receiver analyzes the total power, and after calculating the extra power in the band, a maximum expected average carrier to noise ratio ($C/N_{MaxExp}$) may be calculated. If the measured average $C/N_0$ exceeds $C/N_{MaxExp}$ by a predefined threshold, the receiver determines that spoofing is occurring. However, if the total power in band is increased, and the average $C/N_0$ agrees with $C/N_{MaxExp}$, a jamming attack is detected.

In an illustrative embodiment of the present invention, a receiver may search over the cross-ambiguity function range to identify the number of correlation peaks above the detection threshold. A count is maintained of the number of received PRN codes that have more than one correlation peak above the detection threshold ($N_{Dual}$). Further, the receiver counts the number of PRN codes where the code phase of the cross-ambiguity function (CAF) search is mismatched to the observed tracking ($N_{Mis}$). If the value of $N_{Dual}$, $N_{Mis}$, or the sum of $N_{Dual}$ $N_{Mis}$ exceeds a predefined threshold, the receiver determines that a spoofing attack is occurring. A determination is made that a spoofing attack is occurring if PPPM monitoring and/or the cross-ambiguity function monitoring technique detects a spoofing attack.

In an illustrative embodiment of the present invention, a GNSS receiver receives GNSS signals on a plurality of frequencies. The receiver performs one or more consistency checks on the received signals to determine whether a spoofing attack is occurring. Illustratively, a check is made to determine whether a range measurement from a first frequency matches a range measurement from a second frequency. A check may be made whether a delay of a signal matches with the frequency of the signal. Further, a check may be made to determine whether the received signals match with realistic conditions, e.g., receipt of a PRN code that is not in use may signify a spoofing attack.

BRIEF DESCRIPTION OF THE DRAWINGS

The above and further advantages of the present invention are described herein in conjunction with the accompanying figures in which like reference numerals indicate identical or functionally similar elements, of which.

DETAILED DESCRIPTION OF AN ILLUSTRATIVE EMBODIMENT

Figure 1:
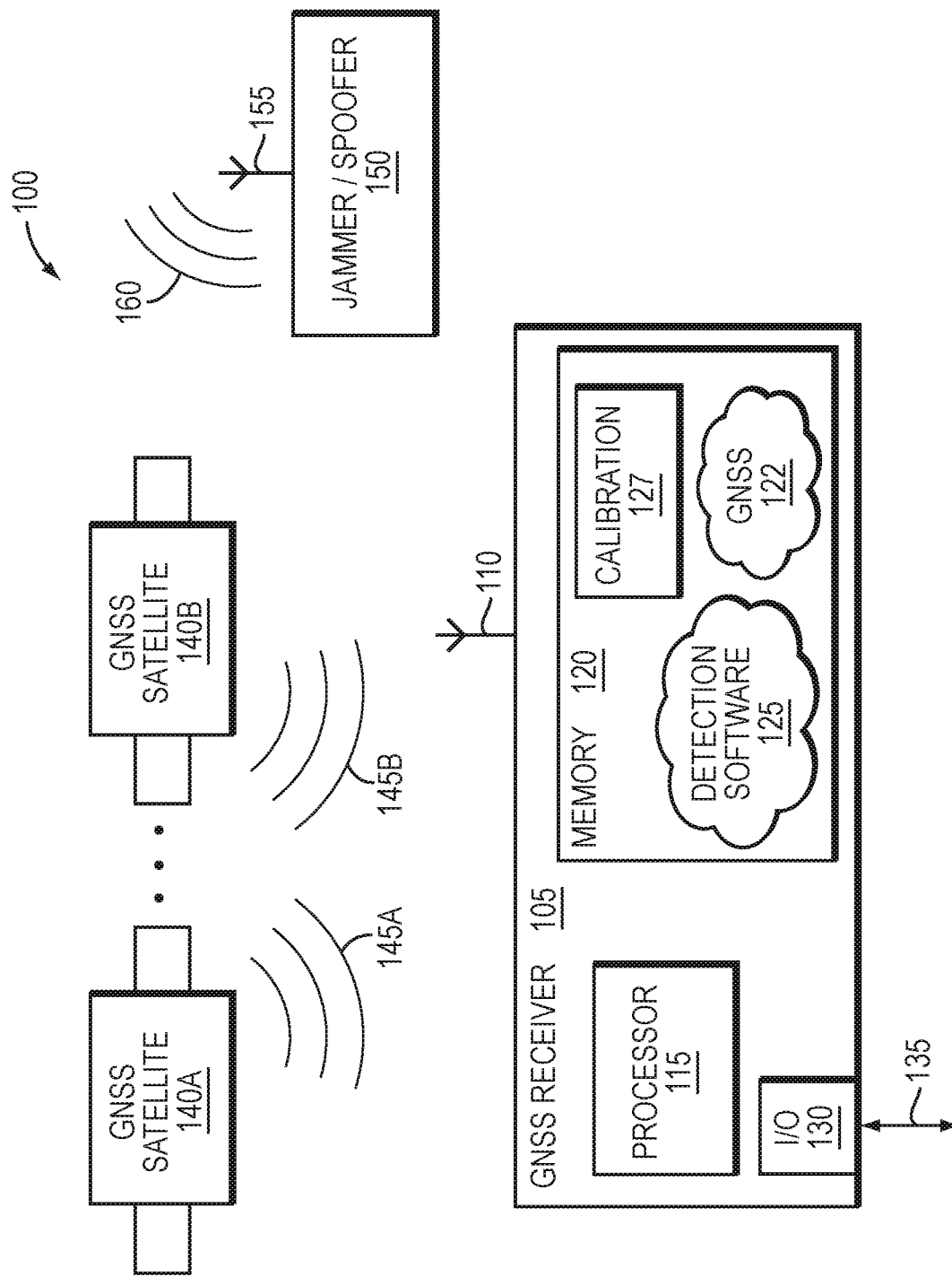
FIG. 1 is a schematic diagram of an exemplary global navigation satellite system (GNSS) environment in accordance with an illustrative embodiment of the present invention.

FIG. 1 is an exemplary diagram of an exemplary global navigation satellite system (GNSS) environment 100 in accordance with an illustrative embodiment of the present invention. Environment 100 illustratively comprises of a GNSS receiver 105, a plurality of GNSS satellites 140A, 140B, and an exemplary jammer/spoofer 150.

A plurality of GNSS systems are currently in operation, e.g., GPS, GLONASS, BeiDou, and Galileo. The illustrative GNSS satellites 140 transmit exemplary GNSS signals 145. Typically, the GNSS satellites 140 broadcast the GNSS signals 145 on a plurality of frequencies, e.g., L1, L2, L5, etc. Illustratively, the carriers of signals 145 are modulated by ranging codes, which are pseudorandom noise (PRNs). A unique PRN is selected for transmission by each satellite, 140A, 140B. A satellite may change which PRN code it transmits over time, but only one satellite transmits a particular PRN code at a given time. GNSS signals 145 also include navigational data, which may include data on the satellite health status, ephemeris (i.e., satellite position and velocity), clock bias parameters, and an almanac giving data on all satellites in the GNSS constellation.

A typical GNSS receiver receives a composite signal consisting of several signals 145 transmitted by the satellites, as well as any noise and interfering signals, such as spoofing signal 160, described further below. A receiver may recover one of the transmitted signals 145 by correlating the composite received signal with a locally generated reference version of the PRN code signal assigned to the particular satellite of interest. If the locally generated PRN reference signal is properly timed, the digital data from that satellite may then be properly detected.

Exemplary jammer/spoofer 150 utilizes an antenna 155 to broadcast a set of spoofing signals 160. The spoofing signals 160 may modulate the carrier with information that conforms to a GNSS standard. However, the spoofing signals may include falsified PRNs and/or incorrect navigation data, e.g., almanac and/or ephemeris data. The purpose of spoofing signals 160 is to cause receivers 105 to determine an incorrect position and/or time. A determination of a position/time that is incorrect may have severe safety of life consequences if, e.g., a crash occurs due to the incorrect position. For example, in an aircraft navigation environment, spoofing signals 160 may cause a receiver 105 to determine an incorrect position. An aircraft relying on such incorrect position information may impact with terrain.

The illustrative receiver 105 includes an exemplary antenna 110 that is utilized by the receiver 105 for receiving GNSS signals 145A,B from the various GNSS satellites 140A,B. Further, if a jammer/spoofing 150 is broadcasting a spoofing signal 160, antenna 110 may also receive the spoofing signal 160. The antenna 110 may also receive other signals, such as interference, noise, etc. Illustratively, the receiver 105 receives GNSS signals 145 at antenna 110 and utilizes well-known techniques to calculate various navigation information including, e.g., position, velocity, etc.

Receiver 105 illustratively comprises of a processor 115, a memory 120 and, in alternative embodiments, an input/output (I/O) module 130. In alternative embodiments, the receiver 105 may comprise additional components (not shown) to implement the functionality described herein in hardware. Such components may comprise, e.g., correlators, ASICs, FPGAs, etc. Therefore, the description of specific components described herein should be taken as exemplary only. As will be appreciated by those skilled in the art, received GNSS signals are typically amplified, down converted, filtered, and converted to a digital format. These functions may be performed in specialized hardware (not shown).

The processor 115 executes various software including exemplary detection software 125 that may be stored in memory 120. Exemplary detection software 125 implements the various spoofing detection techniques described herein in accordance with illustrative embodiments of the present invention. The detection software 125 may interact with GNSS software 122 that illustratively implements conventional position determination functionality. Illustratively, the GNSS software 122 may operate on the digital representation of the received GNSS signal.

Additionally, in illustrative embodiments of the present invention, the detection software 125 may be configured with various calibration data 127 that may be utilized to implement various illustrative embodiments as described herein. Calibration data 127 may be stored in any form of data structure. Illustratively, calibration data 127 may include a calibration $C/N_0$, described further below, or other configuration/calibration data. Illustratively, calibration data 127 may be identified by performing tests in a known environment on the receiver 105. In alternative embodiments, the receiver may obtain calibration data 127 in the field or be programmable by a user depending on configuration changes. Further, while calibration data 127 is shown as being stored in memory 120, as will be appreciated by those skilled in the art, calibration data 127 may be stored in nonvolatile storage in accordance with illustrative embodiments of the present invention. Therefore, the description of calibration data 127 being stored in memory 120 should be taken as exemplary only.

The I/O module 130 may send/receive commands and/or navigation information over link 135. For example, I/O module 130 may communicate over link 135 with a control system for an autonomous vehicle to provide position and/or velocity information. Further, I/O module 130 may be utilized to configure the receiver by e.g., uploading calibration data 127. It should be noted that in alternative embodiments, the functionality of I/O module 130 may be implemented using other components. For example, a user interface (UI) for receiver commands and/or calibration data may be utilized, while a separate data link is utilized to output position information.

It should be noted that while the exemplary receiver 105 is shown and described as having a processor 115 and memory 120, in alternative embodiments of the present invention, the various functionalities described herein may be implemented in other manners. For example, the functionality may be implemented in hardware, firmware, software, or in any combination thereof. Therefore, the description of the various illustrative embodiments of spoofing detection being implemented by operation of detection software 125 being executed by processor 115 should be taken as exemplary only.

In accordance with an illustrative embodiment of the present invention, a first technique for determining the presence of a spoofing attack is based on pre-despreading and post-despreading power measurement (PPPM). More specifically, the receiver monitors the consistency of the PPPM compared to the calibration values. Generally, the pre-despreading power refers to the baseband signal power which is related to the input antenna power and is illustratively measured in dBW. The post-despreading power illustratively refers to the signal power after removing the spreading code and is usually measured by Signal-to-Noise ratio (SNR) in dB and can be translated, via well-known techniques, to a Carrier-to-Noise ratio ($C/N_0$) (dB-Hz) to measure the GNSS signal strength. It is known that the total GNSS power near the Earth's surface is constant. As such, the total power received from the desired bandwidth should be constant and can be calibrated a priori. Any additional power in the band can be monitored and reported as jamming and/or spoofing. The calibration process should be done in a jamming and spoofing free open sky environment.

For a given setup (i.e., receiver, antenna, and cabling combination) the receiver measures the input signal power at pre-despreading level ($P_{cal}$). Illustratively, $P_{cal}$ is the measured power after the RF/IF chain and includes the gain and loss due to the active and passive components of the setup. During the detection process, the receiver illustratively measures an instantaneous input power ($P_{ins}$) and reports an exemplary input power metric ($P_M$) that is determined by $P_M=P_{ins}-P_{cal}$ and that is expressed in dB. Illustratively, $P_M>0$ indicates there is extra signal power in the GNSS band. The extra signal power can be due to jamming or spoofing.

The maximum GNSS signal power at the post-despreading level can be measured in the calibration process known as $C/N_{MaxCal}$. Signal $C/N_0$ level is a function of the path loss between satellite and the receiver antenna, antenna type and the receiver noise figure. As such, maximum $C/N_0$ for a given antenna and the receiver type can be measured and may be stored in calibration data 127.

In the detection mode, the receiver analyzes the total power, and after calculating the extra power in the band (i.e., by calculating $P_M=P_{ins}-P_{cal}$), a maximum expected carrier to noise ratio ($C/N_{MaxExp}$) is calculated. If the measured average $C/N_0$ exceeds $C/N_{MaxExp}$ by a predefined threshold, the receiver determines that spoofing is occurring. This results in an observable inconsistency between an increase of power in the band and a drop in $C/N_0$ measurements. However, if the total power in-band is increased and average $C/N_0$ agrees with $C/N_{MaxExp}$, a jamming attack is detected instead.

Figure 2:
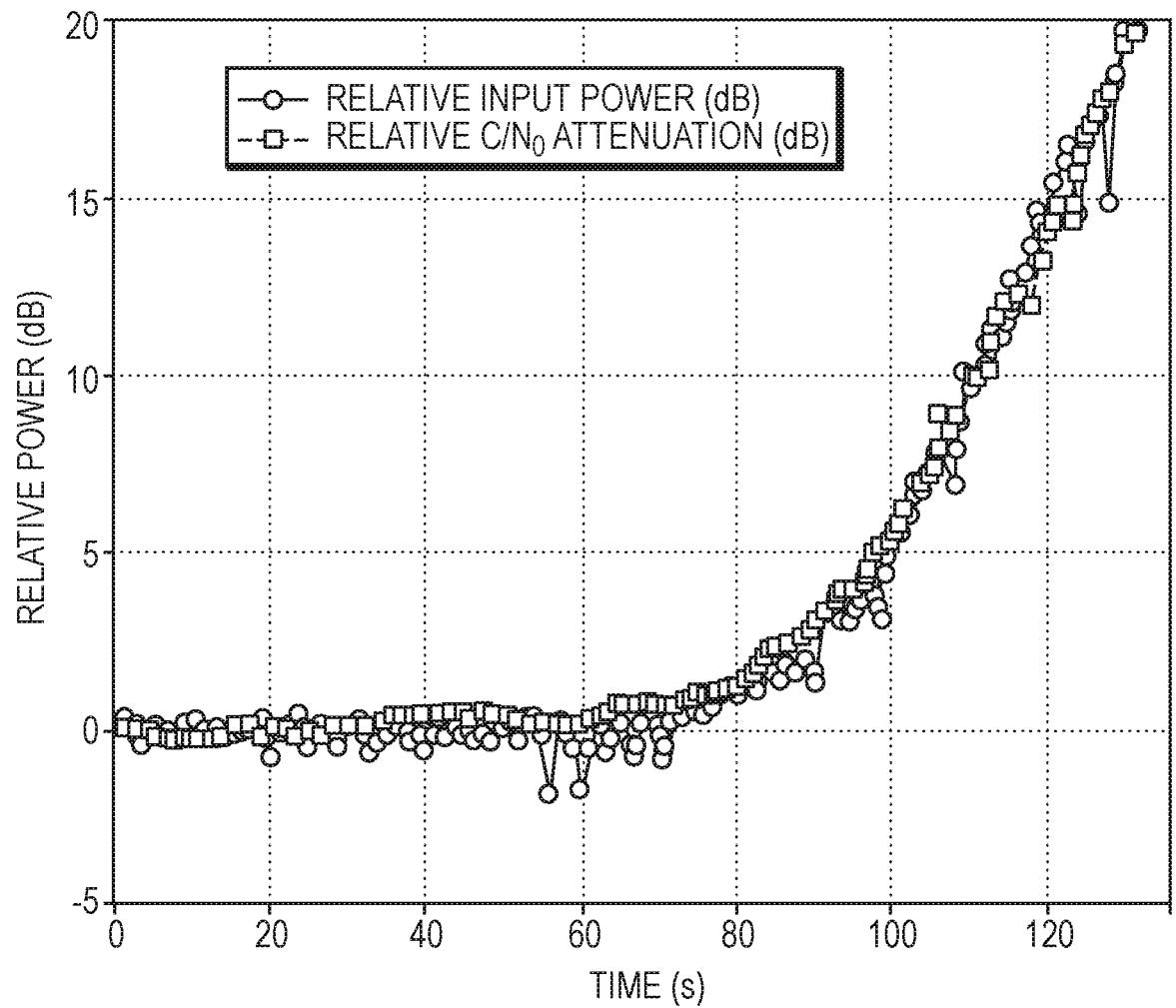
FIG. 2 is a chart illustrating the correlation between power in band and the attenuation of the carrier to noise ($C/N_0$) ratio of GNSS signals in accordance with an illustrative embodiment of the present invention.

FIG. 2 is an exemplary chart 200 illustrating an observed correlation between power in band and carrier to noise ($C/N_0$) attenuation of GNSS signals in a jamming case. As is illustrated by chart 200, as the overall power in band increases over time, the attenuation of $C/N_0$ increases in a highly (nearly perfect) correlated matter. A receiver may detect discrepancies in the correlation of the power in band and attenuation of $C/N_0$ to determine that a receiver is being jammed or spoofed as described herein.

Figure 3:
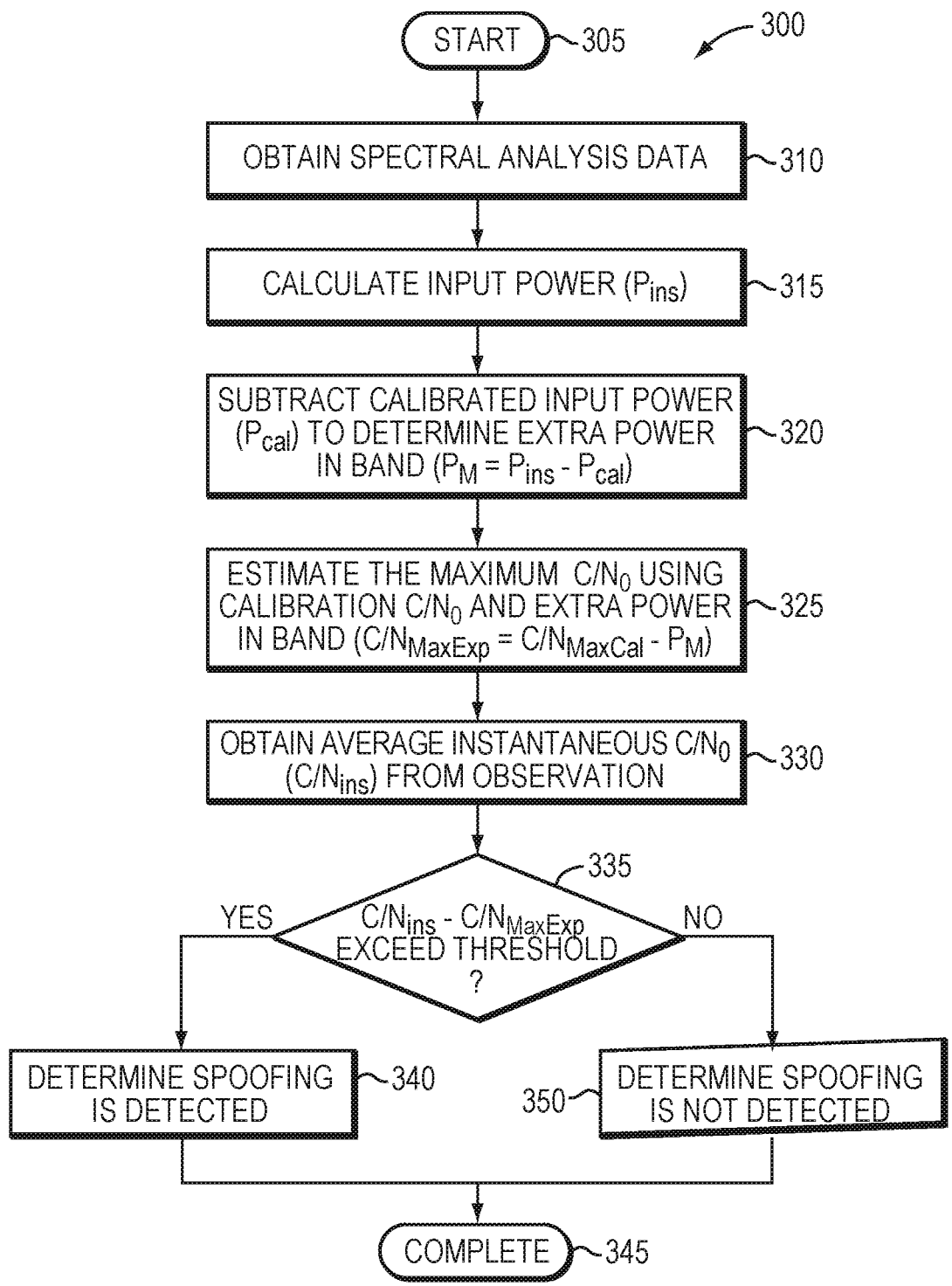
FIG. 3 is a flowchart detailing the steps of an exemplary procedure for determining whether GNSS spoofing is occurring in accordance with an illustrative embodiment of the present invention.

FIG. 3 is a flowchart detailing the steps of an exemplary procedure 300 for determining whether spoofing is occurring in accordance with an illustrative embodiment of the present invention. Illustratively, procedure 300 utilizes observed discrepancies in the correlation between total power in band and $C/N_0$ attenuation to make spoofing determinations. Procedure 300 begins in step 305 and continues to step 310 where the receiver obtains spectral analysis data related to the signals being received by antenna 110. Then, in step 315, the current instantaneous input power ($P_{ins}$) is calculated. $P_{ins}$ may be calculated from the received spectral analysis data. As will be appreciated by those skilled in the art, various techniques may be utilized to determine the input power from the received GNSS signals.

A previously calibrated input power ($P_{cal}$) is then subtracted from the instantaneous input power ($P_{ins}$) to determine extra power in the band in step 320 ($P_M=P_{ins}-P_{cal}$). Illustratively, $P_{cal}$ is measured in the clean open skies scenario for a given receiver setup. This calibrated input power may be stored by the receiver in, e.g., calibration data 127. For example, during an initial calibration of the receiver, the calibrated input power may be obtained and stored as calibration data 127. Illustratively, a particular setup is tied to the receiver 105, antenna 110, types and lengths of cables, etc. By subtracting this calibrated input power from the calculated input power, the extra power in the band ($P_M$) may be obtained. As noted, a discrepancy with the correlation of extra power in the band and attenuation of $C/N_0$ may signify the presence of spoofing signals.

Utilizing the calibrated $C/N_{MaxCal}$ and the calculated extra power in the band ($P_M$), an estimation is made of the maximum $C/N_{MaxExp}=C/N_{MaxCal}-P_M$ in step 325. In one implementation a calibrated $C/N_{MaxExp}$ is measured based on the average of a plurality of high elevation PRN's for a given set up. In other more sophisticated implementation, during the calibration process the $C/N_{MaxCal}$ values are measured considering the path loss (due to distance from satellite to the user) and the antenna gain pattern. Hence, the receiver creates a look-up table for $C/N_{MaxCal}$ for a given PRN considering its azimuth, elevation and location and the antenna gain pattern. This look up table may be stored in memory in calibration data 127. It should be noted that the description of a look up table should be taken as exemplary only. In accordance with illustrative embodiments of the present invention, the information may be stored in any form of data structure.

During the detection period, the receiver compares the $C/N_{MaxExp}$ against the measured average instantaneous $C/N_0$ ($C/N_{ins}$) obtained from the received GNSS signal in step 330. A determination is made in step 335 whether predespreading post-despreading power monitor, illustratively calculated as PPPM=$C/N_{ins}-C/N_{MaxExp}$, exceeds a predefined threshold. In accordance with an illustrative embodiment of the present invention, if PPPM is greater than a predefined threshold, there is a strong implication that there is significant extra power in the band that is not attenuating $C/N_0$. As extra power in the band should correlate with an attenuation of the $C/N_0$, this discrepancy indicates that there is a spoofing signal that is being received at the antenna. If $P_{ins}-P_{cal}>0$ and PPPM is below predefined threshold a jamming attack is detected.

Illustratively, the threshold may be set at a particular level, e.g., 3 dB, 5 dB, 9 dB, etc. based on a user's preference for the possibility of false positives. By increasing the threshold value, a reduction in false positive determinations of spoofing may be achieved. However, the system may fail to register spoofing activity that does not generate a significant attenuation in the $C/N_0$. Conversely, a low predefined threshold value may be set to capture all possible cases of spoofing. However, a low predefined threshold value may also erroneously determine that spoofing is occurring when it is not. The predefined threshold may be set based on a variety of factors including, for example, safety of life requirements for a particular application of the GNSS receiver. Further, in alternative embodiments, the predefined threshold may vary over time. In accordance with illustrative embodiments, the threshold may be user adjustable.

If PPPM exceeds the predefined threshold, the procedure 300 branches to step 340 and decides that spoofing is being detected. The receiver may take various corrective actions in response to a determination that spoofing is being detected. For example, the receiver may cease transmitting position and/or velocity information over link 315. In alternative embodiments, if the receiver is associated with a suitable backup navigation system, such as an inertial navigation system, the GNSS navigation information may be ignored as it is viewed as being spoofed. As will be appreciated by those skilled in the art, a variety of remedial actions may be taken once the receiver has determined that spoofing is occurring. The procedure then completes in step 345.

The description of procedure 300 is shown as being linear, however, in illustrative embodiments of the present invention, the procedure 300 is performed continuously by the receiver to monitor received GNSS signals from antenna 110. Therefore, the description of procedure 300 proceeding in a linear manner should be taken as exemplary only.

However, if in step 335 it is determined that PPPM does not exceed the threshold, the procedure 300 branches to step 350 and determines that spoofing has not been detected. Upon determining that spoofing has not been detected, the receiver may continue to function in its normal manner by, e.g., transmitting position information over exemplary link 315. The procedure 300 then completes in step 345.

Figure 4A:
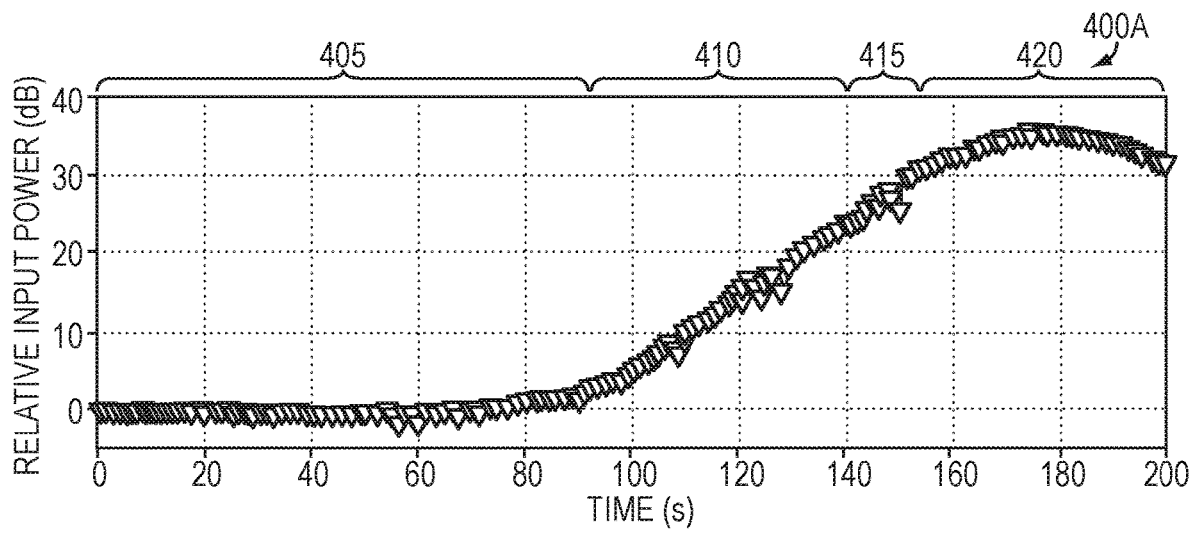
FIG. 4A is a graph illustrating changes to relative power input over time accordance with an illustrative embodiment of the present invention.

FIGS. 4A, B, C are exemplary graphs 400A, B, C that illustrate the relationship among relative input power, average $C/N_0$ and PPPM in accordance with an illustrative embodiment of the present invention. FIGS. 4A, B, C may be viewed in relation to procedure 300 to show an example of a spoofing attack. Each of the figures shows the same time period and exemplary values that a receiver could detect to make a spoofing determination in accordance with procedure 300. It should be noted that the numbers shown in graphs 400A, B, C are exemplary only and should not be taken as limiting.

FIG. 4A is a graph 400A that illustrates changes in relative input power over time. In exemplary graph, relative input power begins near 0 and begins to increase at approximately 60 seconds, with a sharp increase at 100 seconds, before peaking at approximately 180 seconds.

Figure 4B:
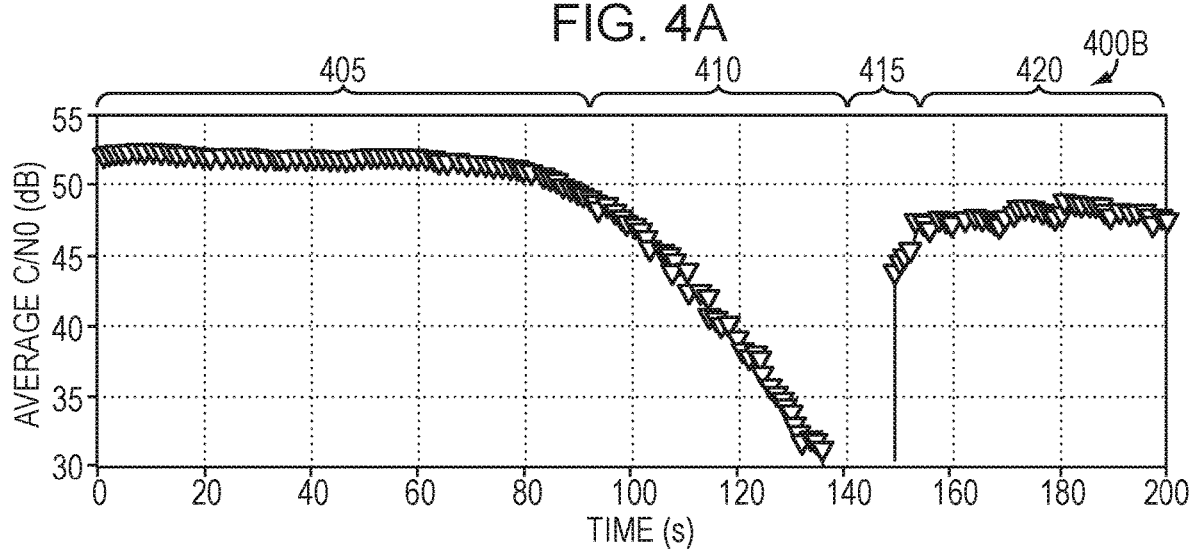
FIG. 4B is a graph illustrating changes to carrier to noise ratio ($C/N_0$) over time in accordance with an illustrative embodiment of the present invention.

FIG. 4B illustrates average $C/N_0$ over time. As will be appreciated, as the relative power input increases from the 80 second mark (see FIG. 4A), the average $C/N_0$ decreases as expected. However, at approximately 150 seconds, the $C/N_0$ spikes, even though the relative input power remains elevated.

Figure 4C:
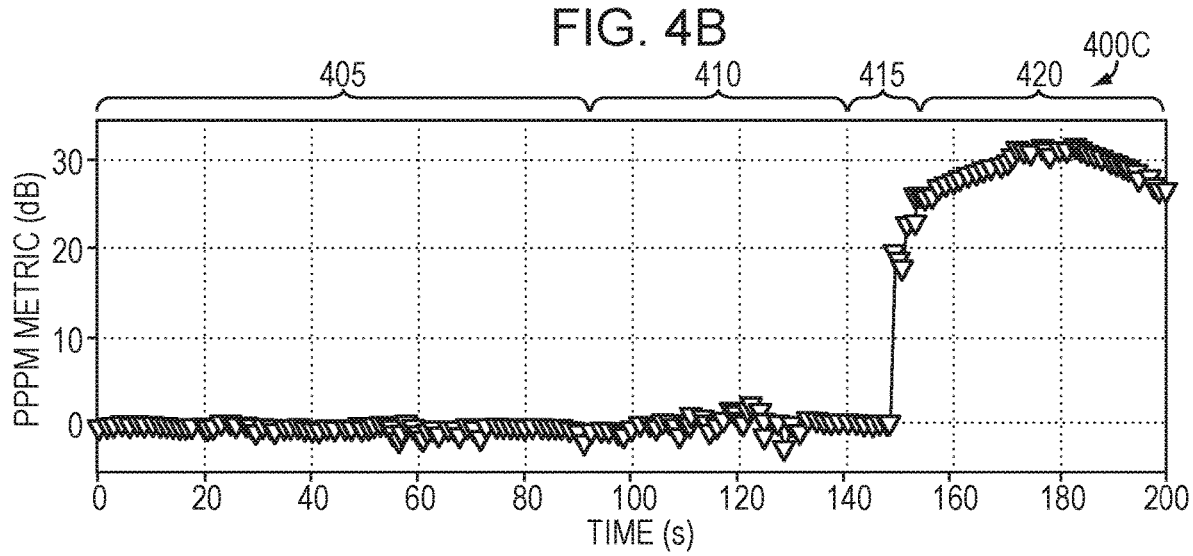
FIG. 4C is a graph illustrating changes to PPPM in accordance with an illustrative embodiment of the present invention.

FIG. 4C illustrates the PPPM metric against time in the example provided herein. The PPPM metric remains at approximately 0 indicating no spoofing activity has been detected. However, at time 150 seconds, it spikes indicating the receiver is tracking the spoofed signals.

Graphs 400A, B, C illustrates a receiver beginning in normal operation, being jammed, losing tracking, and then being spoofed. Illustratively, during time period 405 the receiver is in normal operation. Illustratively, the average $C/N_0$ is between 50-55 dB for the plurality of PRN codes being tracked.

During time period 410, a jamming signal begins to be received and the relative input power is increased by approximately 25 dB. Due to the increased power in the band, the $C/N_0$ of the various received PRNs is attenuated from 50-55 dB down to approximately 30 dB. As the total power in band is at significantly higher level during time period 415, the power in band may attenuate the signal so much that a lock on PRNs may be lost. At the beginning of time period 420, a lock on the PRN codes is re-obtained; however, the average $C/N_0$ is elevated even with substantial power in band. This is an indicator that spoofing is occurring. In accordance with procedure 300, during time period 420 the receiver would make a determination that spoofing is occurring. At the relative power level indicated in time period 420 (approximately 30 dB over the baseline), the $C/N_{MaxExp}$ should be approximately 30 dB, as shown towards the end of time period 415. However, as the average observed $C/N_{ins}$ is substantially elevated (i.e., between 45-50 dB), the difference of $C/N_{ins}-C/N_{MaxExp}$ would be on the order of 25 dB.

Figure 5:
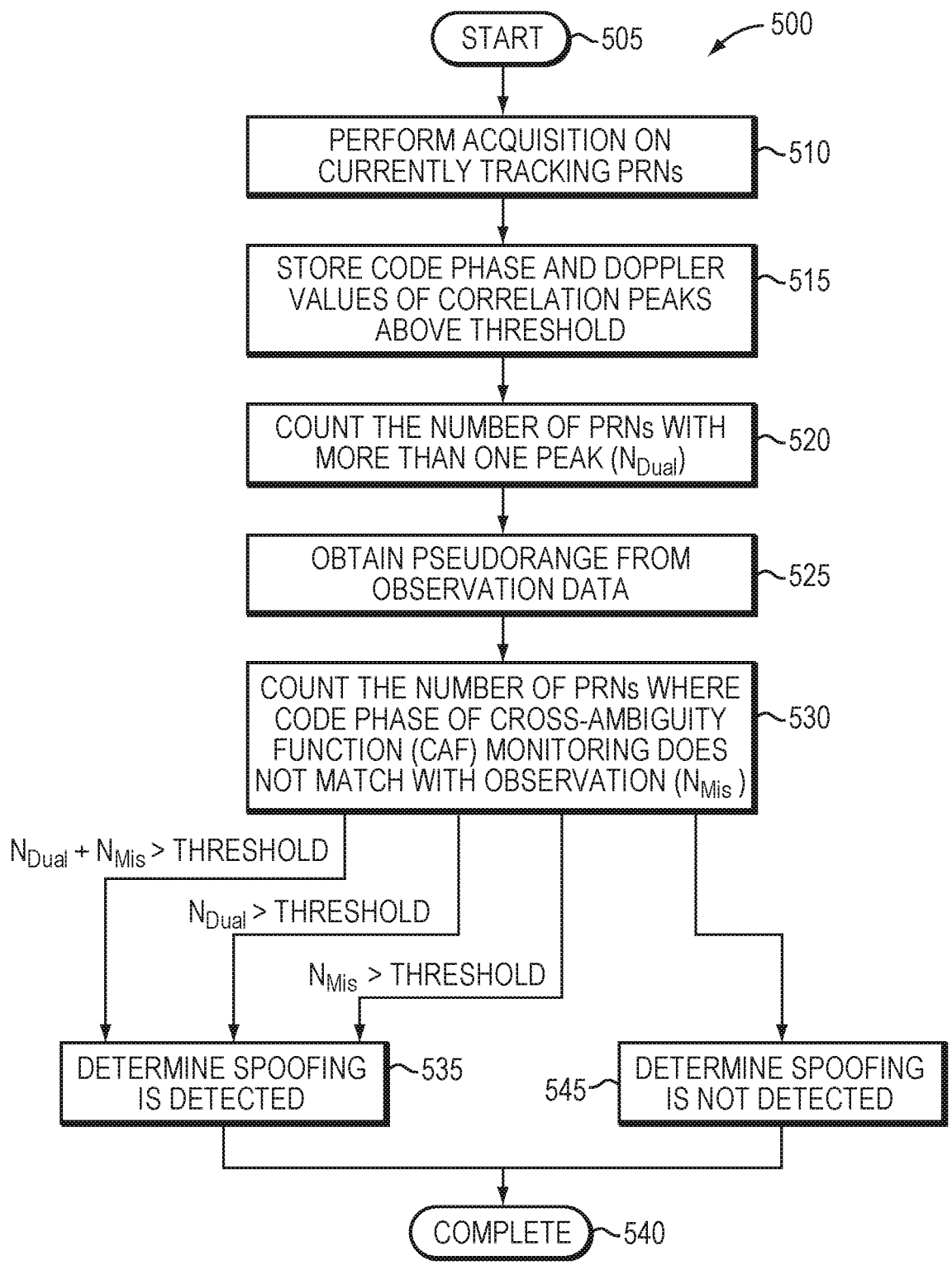
FIG. 5 is a flowchart detailing the steps of an exemplary procedure for determining whether GNSS spoofing is occurring in accordance with an illustrative embodiment of the present invention.

In accordance with an illustrative embodiment of the present invention, a second technique for spoofing detection is shown in FIG. 5, which is a flowchart detailing the steps of an exemplary procedure 500 for determining whether spoofing is occurring. In accordance with embodiments of the present invention, procedure 500 may be utilized in conjunction with procedures 300 and/or 700, described further below, for detection of spoofing attacks. In alternative embodiments, procedure 500 may be utilized alone in determining spoofing attacks. Exemplary procedure 500 utilizes the identification of the number of correlation peaks above a threshold value in the cross-ambiguity function (CAF) of received signals to aid in determination of spoofing. The procedure 500 begins in step 505 and continues to step 510 when the system performs continuous code phase and Doppler search on currently tracking PRNs. This may be accomplished using conventional GNSS signal acquisition techniques by, e.g., mixing a local carrier wave and PRN code replica and then integrating the result before squaring the value. The Doppler and code phase search range may be different from that of the receiver's conventional acquisition search strategy. By examining the cross-ambiguity function range, correlation peaks may be identified.

Figure 6:
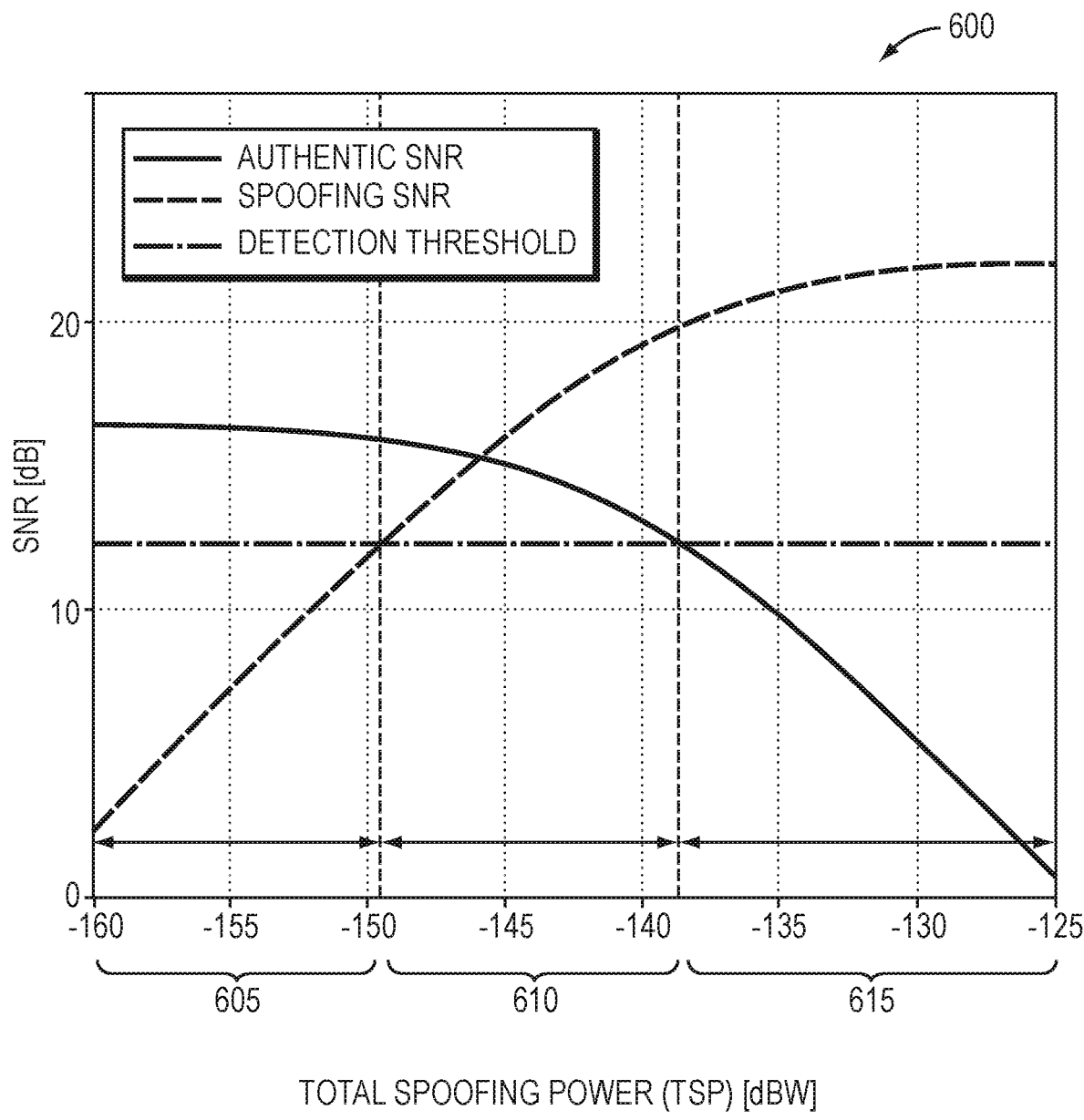
FIG. 6 is a chart illustrating exemplary signal-to-noise ratios (SNRs) and correlation peaks in accordance with an illustrative embodiment of the present invention.

FIG. 6 is a chart 600 illustrating average signal-to-noise ratios (SNRs) and detectable correlation peaks in accordance with an illustrative embodiment of the present invention in the presence of spoofing and authentic signals. As is illustrated in chart 600, as the total spoofing power (TSP) is increased, the averaged authentic SNR is decreased while the averaged spoofing SNR is increased. In the example shown in FIG. 6, the detection threshold is set at 12 dB. For the given example in region 605, the total spoofing power (TSP) is less than −150 dBW. Therefore, the spoofing SNR is under the detection threshold and only authentic signals are detected. Within region 605, the only harmful effect of the spoofer signals is a reduction in the authentic signal SNR. Region 610, which represents a TSP of between −150 dBW and −139 dBW, both the authentic and spoofing signals are above the detection threshold. Consequently, two correlation peaks may be detected. This may cause a newly initialized receiver to acquire the spoofing correlation peak when the spoofer SNR is above the authentic signal SNR. Region 615 is when the TSP is above −139 dBW, which causes the authentic signal SNR to fall below the detection threshold. In this region, only the spoofing signals are detected by receiver.

For each correlation peak that exceeds the detection threshold, the code phase and Doppler values are stored, in step 515, for later use in step 530, described further below. For each detected peak above the threshold an additional try may be made to reduce the false detection probability. In addition, in an exemplary strong signal case, several events of the signal passing the detection threshold in the authentic case may happen. Illustratively, this can be due to the cross-correlation property of a PRN sequence or due to the sinc function's property of the correlation function in the frequency domain. Illustratively, the attempt is to reduce the false dual-peak detection due to the aforementioned properties.

A count of the number of PRNs with more than one correlation peak ($N_{Dual}$) is made in step 520 after searching the entire code-phase and Doppler bins. That is, if the output of correlation for a particular PRN code has more than one correlation peak that exceeds the detection threshold, $N_{Dual}$ is increased. After analyzing each of the PRN codes that are being tracked, a total number of PRN codes that have more than one correlation peak above the detection threshold is made.

The pseudorange is obtained from observational data in step 525. This is performed in the conventional manner for the GNSS system by, e.g., multiplying the speed of light by the time a GNSS signal has taken from a satellite to the receiver.

The detection software then counts the number of PRNs where the code phase of cross-ambiguity function (CAF) monitoring does not match the observed tracking code phase ($N_{Mis}$) in step 530. This may happen when only one correlation peak is detected but the code phase of the CAF does not match that of the tracking one as shown in region 615 of FIG. 6. More specifically, in such case the spoofing power is higher than that of the authentic signal and increases the noise floor of the CAF where the authentic peak is not detectable. Illustratively, however, the receiver is still tracking the authentic signals. Using the stored code phase of acquisition from step 510, a comparison is made with the current code phase of tracking for each PRN code. Similar to determining $N_{Dual}$, a count is made of each PRN code that has a mismatch between the code phase of acquisition and the observed code phase ($N_{Mis}$). The $N_{Mis}$ value represents the number of PRN codes where there is a mismatch between the observed tracking and the code phase of acquisition.

Once $N_{Mis}$ and $N_{Dual}$ have been determined, the procedure 500 may determine whether either one exceeds a predefined threshold and also whether $N_{Dual}+N_{Mis}$ exceeds a predefined threshold. Each of the predefined thresholds may be set at a value to limit the number of false positives. A lower threshold value may determine that spoofing is occurring when it is not. A higher value may miss occurrences of spoofing. Illustratively, the threshold value is between 2-5 for $N_{Dual}+N_{Mis}$. However, it is expressly contemplated that in alternative embodiments, the threshold value may be outside of that range. Therefore, the range of 2-5 should be taken as exemplary only. A threshold value may be set based on the criticality of safety of life concerns for a particular GNSS receiver application.

If the total of $N_{Dual}+N_{Mis}$ exceeds the predefined threshold, the procedure 500 branches to step 535 and determines that spoofing has been detected. Appropriate remodel measures may then be taken. The procedure 500 then completes in step 545. Similarly, if $N_{Dual}$ or $N_{Mis}$ exceeds a predefined threshold associated with that particular count, the procedure branches to step 535 and determines that spoofing is detected. The procedure then completes in step 540.

If $N_{Dual} N_{Mis}$, $N_{Dual}$, or $N_{Mis}$ exceeds the particular threshold, the receiver then determines that spoofing is not detected in step 545. It should be noted that in accordance with illustrative embodiments of the present invention, each of $N_{Dual}+N_{Mis}$, $N_{Dual}$, and $N_{Mis}$ may have a separate threshold value. The procedure then completes in step 540.

Figure 7:
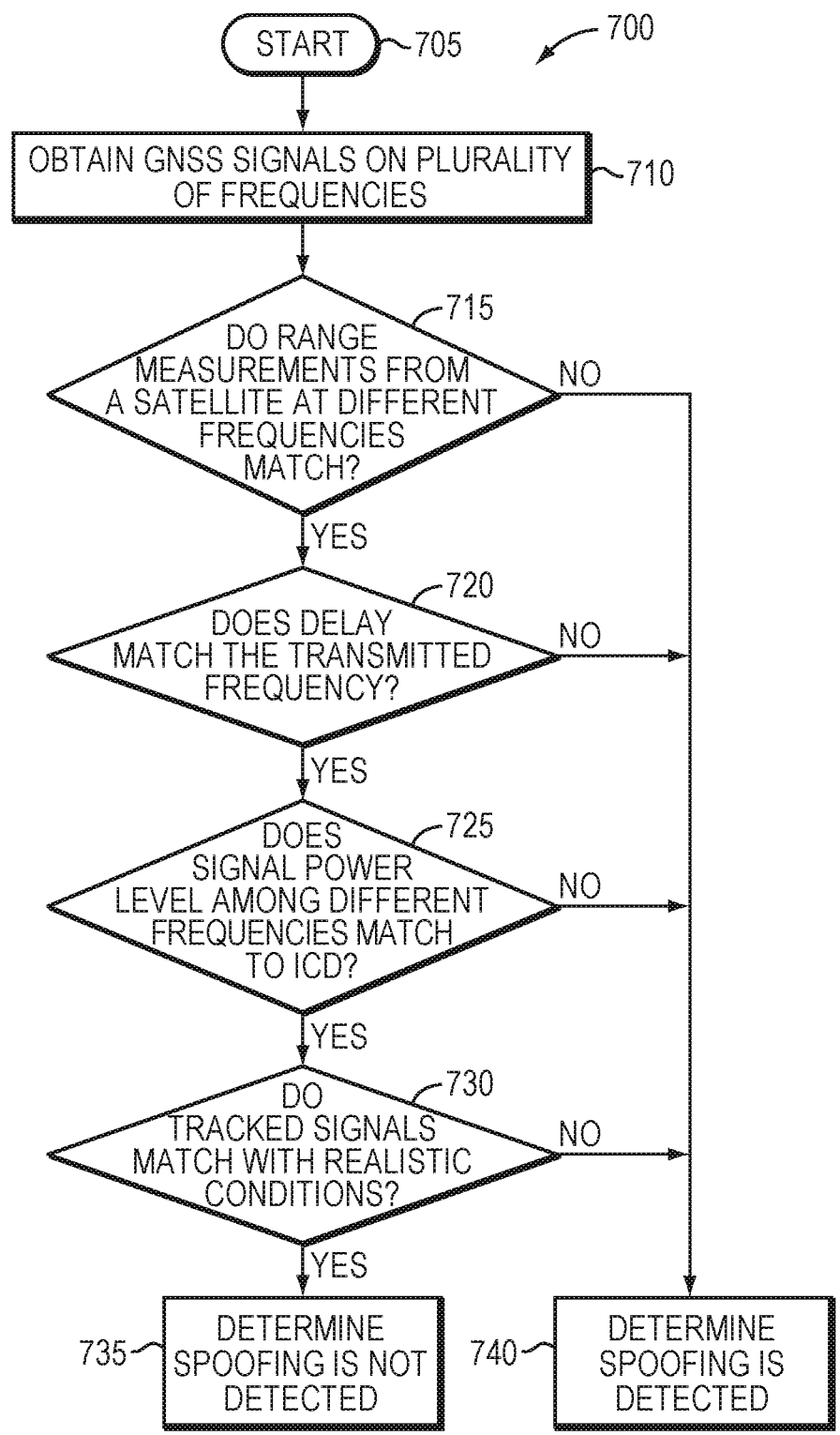
FIG. 7 is a flowchart detailing the steps of an exemplary procedure for determining whether GNSS spoofing is occurring in accordance with an illustrative embodiment of the present invention.

FIG. 7 is a flowchart detailing the steps of an exemplary procedure 700 for determining whether spoofing is occurring in accordance with an illustrative embodiment of the present invention. Illustratively, procedure 700 may be utilized to provide an additional level of scrutiny to determine whether a GNNS receiver is being spoofed in accordance with illustrative embodiments of the present invention. However, it should be noted that in alternative embodiments of the present invention, procedure 700 may be utilized as a primary technique for determining whether a GNSS receiver is being spoofed. Therefore, the description of procedure 700 being used as an auxiliary or additional technique should be taken as exemplary only. As noted above, GNSS signals are typically transmitted on multiple frequencies, e.g., L1, L2, L5, etc. Exemplary procedure 700 utilizes the multi-frequency nature of GNSS signals to monitor the authenticity of the received signals.

The procedure 700 begins in step 705 and continues to step 710 where GNSS signals are obtained on a plurality of frequencies. As noted above, the GNSS signals 145 are transmitted on a plurality of frequencies by satellites 140. These signals 145 are received by antenna 110 and are processed by the receiver using, e.g., GNSS software 122 and/or spoofing detection software 125.

In step 715, a determination is made whether range measurements from a single satellite at different frequencies match. That is, a determination is made whether the range measurement from a first frequency from a given satellite matches the range measurement from a second frequency from the same satellite. Similarly, the same determination would be made in relation to the first frequency and a third frequency in accordance with an illustrative embodiment. Ideally, this determination is made for all combinations of frequencies for a given satellite. In normal operation, all range measurements from a given satellite should match. However, if there is a mismatch in ranges, it may indicate that a spoofer is broadcasting spoofing signals on a subset of the frequencies for the GNSS constellation. For example, a spoofer may be broadcasting a spoofed signal on L1, but not on L5. In this example, the receiver may determine a range measurement using the L1 signal and a range measurement using the L5 signal. As L1 is being spoofed, the range measurements will not match.

If there is a mismatch in range measurements among different frequencies from the same satellite, the procedure 700 branches to step 740 where the receiver determines that spoofing has been detected. Appropriate remedial steps may then be taken.

In step 720, a determination is made whether the delay associated with the received signals matches a transmitted frequency. As GNSS signals pass through the ionosphere from a satellite to a receiver, they are delayed. The length of the delay is affected by a plurality of factors, including, e.g., the frequency of the signal passing through the ionosphere. Specifically, higher frequencies are delayed less than lower frequencies. Therefore, given a GNSS signal received on a plurality of frequencies, the signal on a higher frequency, e.g., L1, should be delayed less than a signal on a lower frequency, e.g., L5. If, in step 720, it is determined that the observed delay does not match with the received frequency, it is an indicator that spoofing is occurring.

In step 725, a determination is made whether a signal power level in different frequencies match to the published standards and matches with the receiver hardware, e.g., antenna gain pattern and the receiver noise figure for different frequencies. In the example of GPS, the standards are defined in the Interface Control Documents (ICD). For example, currently the signal power level for signals on the L5 frequency on average should be 1.5 dB higher than signals on the L1 frequency. As a spoofer is substantially closer to a GNSS receiver than a GNSS satellite, the spoofing signals will typically not conform to the published standards. Detecting this mismatch between the published standards and received signals may be utilized to determine whether the received signals are the result of spoofing.

In step 730, a determination is made whether the tracked signals match with realistic conditions. This step illustratively involves comparing the received signals with published standards and known conditions. For example, if it is known that a particular PRN is currently not in use, reception of a signal encoded with that PRN will indicate that a spoofing signal is being received. Similarly, if a receiver knows its general position, it may be possible to know that a particular satellite is not visible. Reception of a signal indicating that it is from that satellite is a further indication that spoofing signals are being received.

A further example in relation to determining whether the signals match with realistic conditions is to check the signal amplitude fluctuations due to propagation channel distortion. In a spoofing scenario, where all the PRNs are transmitted from a single antenna 155, any changes in the propagation environment affects all the PRNs in the same way. More specifically, multipath, signal attenuation, and/or fading, etc. will be the same for all the PRNs. In the authentic case, since each PRN is transmitted from different locations (i.e., differing satellites 140A, B) the channel distortion will be different for different PRNs. This feature can be used to detect a spoofing attack.

A determination that the received signals do not match with realistic conditions causes the procedure to branch to step 740. If the tracked signals match with the realistic conditions, the procedure 700 then branches to step 735 and determines that no spoofing is being detected.

Illustratively, the procedure 700 may be utilized in accordance with other spoofing detection techniques to perform a further level of checking. It should be noted that the various determinations described in connection with procedure 700 may be ordered in alternative ways from that described herein. Further, the system may not perform all of the determinations in accordance with alternative embodiments. Therefore, the description and ordering of the various determinations should be taken as exemplary only. As noted above, in illustrative embodiments of the present invention, procedure 700 may be used to verify a spoofing/no spoofing determination made using other techniques.

It is expressly contemplated that a GNSS receiver 105 may implement one or more of the spoofer detection embodiments described herein in accordance with various illustrative embodiments of the present invention. The use of a plurality of metrics for determining whether a spoofing attack is occurring works to increase the accuracy of detection of spoofing attacks. This is especially true due to the increase sophistication of spoofers. Further, in a particular exemplary implementation, a receiver 105 may only implement portions of the disclosure herein due to design choices. For example, a system may only implement, e.g., procedure 300 and procedure 700, but not procedure 500 in accordance with an illustrative embodiment of the present invention. The present invention has been described in relation to various illustrative embodiments. Therefore, it should be noted that the embodiments described herein should be viewed as exemplary and not limiting.

What is claimed is:

1. A computer implemented method, comprising:
   receiving, at an antenna of a Global Navigation Satellite System (GNSS) receiver, a GNSS signal;
   determining an instantaneous input power value ($P_{ins}$) of the GNSS signal;
   calculating an extra power value ($P_M$) by subtracting a calibrated input power value ($P_{Cal}$) from the $P_{ins}$;
   calculating a maximum expected average carrier to noise ratio ($C/N_{MaxExp}$) using a calibrated maximum carrier to noise ratio value ($C/N_{MaxCal}$) and the $P_M$;
   determining an instantaneous average carrier to noise ratio ($C/N_{ins}$) associated with the GNSS signal; and
   determining, by the GNSS receiver, whether a difference of the $C/N_{MaxExp}$ and the $C/N_{ins}$ exceeds a predefined threshold to identify a spoofing attack on the GNSS receiver.

2. The computer implemented method of claim 1, wherein the predefined threshold is between 1 dB and 20 dB.

3. The computer implemented method of claim 1, further comprising:
   measuring the $P_{Cal}$ as an input signal power at a pre-despreading level using the antenna in a jamming/spoofing free open sky environment.

4. The computer implemented method of claim 1, further comprising:
   measuring the $C/N_{MaxCal}$ as a signal power at a post-despreading level using the antenna in a jamming/spoofing free open sky environment; and
   determining that a jamming attack is occurring in response to the $C/N_{ins}$ being substantially equal to the $C/N_{MaxExp}$.

5. The computer implemented method of claim 4, wherein the signal power at the post-despreading level is an average of a plurality of high elevation pseudorandom noise (PRN) codes.

6. The computer implemented method of claim 4, wherein the signal power at the post-despreading level is based on at least one of a gain pattern of the antenna, elevation and azimuth of angles of a satellite, and a distance between an antenna of the satellite and the antenna of the GNSS receiver.

7. The computer implemented method of claim 1, comprising:
   identifying, by searching over a cross-ambiguity function (CAF) range, a count of a number of pseudorandom noise (PRN) codes that have more than one correlation peak above a detection threshold in the CAF range ($N_{Dual}$);
   identifying a number of PRN codes where a code phase of the CAF search is mismatched to a code phase of observation tracking ($N_{Mis}$);
   comparing the sum of the $N_{Dual}$ and the $N_{Mis}$ to a sum predefined threshold; and
   determining that the spoofing attacking is occurring if the sum of the $N_{Dual}$ and the $N_{Mis}$ exceeds the sum predefined threshold.

8. The computer implemented method of claim 7, further comprising:
  comparing the $N_{Dual}$ to a dual predefined threshold; and
  determining that the spoofing attacking is occurring if the $N_{Dual}$ exceeds the dual predefined threshold.

9. The computer implemented method of claim 7, further comprising:
  comparing the $N_{Mis}$ to a third predefined threshold; and
  determining that the spoofing attacking is occurring if the $N_{Mis}$ exceeds the third predefined threshold.

10. The computer implemented method of claim 1, further comprising:
  determining whether a first range measurement calculated using the GNSS signal substantially matches a second range measurement calculated using a GNSS second signal, wherein the GNSS signal and the second GNSS signal are associated with different frequencies;
  in response to the first range measurement not substantially matching the second range measurement, determining that the spoofing attack is occurring;
  determining whether a first delay associated with the GNSS signal is an expected value when compared to a second delay associated with the second GNSS signal; and
  in response to the first delay not being the expected value when compared to the second delay, determining that the spoofing attack is occurring.

11. The computer implemented method of claim 10, further comprising:
  calculating a first signal power level associated with the GNSS signal;
  determining whether the first signal power level substantially matches to a standard; and
  in response to determining that the first signal power level does not substantially match to the standard, determining that the spoofing attack is occurring.

12. The computer implemented method of claim 11, further comprising:
  calculating a second signal power level associated with the second GNSS signal;
  determining whether the second signal power level substantially matches to the standard; and
  in response to determining that the second signal power level does not substantially match to the standard, determining that the spoofing attack is occurring.

13. The computer implemented method of claim 10, further comprising:
  calculating a first signal power level associated with the GNSS signal;
  calculating a second signal power level associated with the second GNSS signal;
  determining whether the first signal power level and the second signal power level are consistent with a predefined standard; and
  in response to determining that the first signal power level and the second signal power level are not consistent with the predefined standard, determining that the spoofing attack is occurring.

14. The computer implemented method of claim 10, further comprising:
  determining whether the GNSS signal substantially matches a set of predefined conditions; and
  in response to determining that the GNSS signal does not substantially match to the set of predefined condition, determining that the spoofing attack is occurring.

15. The computer implemented method of claim 14, wherein the set of predefined conditions comprises whether a pseudorandom noise (PRN) code associated with the GNSS signal is associated with a visible satellite.

16. The computer implemented method of claim 14, wherein the set of predefined conditions comprises whether a pseudorandom noise (PRN) code associated with the GNSS signal is currently in use.

17. The computer implemented method of claim 14, wherein the set of predefined conditions comprises whether a set of propagation factors affecting the GNSS signal also affects a third GNSS signal.

18. The computer implemented method of claim 1, further comprising:
  in response to determining that the difference of the $C/N_{MaxExp}$ and the $C/N_{ins}$ exceeds the predefined threshold, determining that the spoofing attack is occurring.

19. A Global Navigation Satellite System (GNSS) receiver, comprising:
  a processor configured to:
    determine an instantaneous input power value ($P_{ins}$) of a received GNSS signal;
    calculate an extra power value ($P_M$) by subtracting a calibrated input power value ($P_{Cal}$) from the $P_{ins}$;
    calculate a maximum expected average carrier to noise ratio ($C/N_{MaxExp}$) using a calibrated maximum carrier to noise ratio value ($C/N_{MaxCal}$) and the $P_M$;
    determine an instantaneous average carrier to noise ratio ($C/N_{ins}$) associated with the GNSS signal; and
    determine whether a difference of the $C/N_{MaxExp}$ and the $C/N_{ins}$ exceeds a predefined threshold to identify a spoofing attack on the GNSS receiver.

20. The system of claim 19, wherein the processor is further configured to:
  measure the $C/N_{MaxCal}$ as a signal power at a post-despreading level in a jamming/spoofing free open sky environment; and
  determine that a jamming attack is occurring in response to the $C/N_{ins}$ being substantially equal to the $C/N_{MaxExp}$.

21. The system of claim 19, wherein the processor is further configured to:
  identify, by searching over a cross-ambiguity function (CAF) range, a count of a number of pseudorandom noise (PRN) codes that have more than one correlation peak above a detection threshold in the CAF range ($N_{Dual}$);
  identify a number of PRN codes where a code phase of the CAF search is mismatched to a code phase of observation tracking ($N_{Mis}$);
  compare the sum of the $N_{Dual}$ and the $N_{Mis}$ to a sum predefined threshold; and
  determine that the spoofing attacking is occurring if the sum of the $N_{Dual}$ and the $N_{Mis}$ exceeds the sum predefined threshold.

22. The system of claim 19, wherein the processor is further configured to:
  determine whether a first range measurement calculated using the GNSS signal substantially matches a second range measurement calculated using a second GNSS signal, wherein the GNSS signal and the second GNSS signal are associated with different frequencies;
  in response to the first range measurement not substantially matching the second range measurement, determine that the spoofing attack is occurring;
  determine whether a first delay associated with the GNSS signal is an expected value when compared to a second delay associated with the second GNSS signal; and in response to the first delay not being the expected value when compared to the second delay, determine that the spoofing attack is occurring.

23. The system of claim 19, wherein the processor is further configured to:
in response to determining that the difference of the $C/N_{MaxExp}$ and the $C/N_{ins}$ exceeds the predefined threshold, determine that the spoofing attack is occurring.

* * * * *